United States Patent [19]
Fujiwara et al.

[11] Patent Number: 5,484,341
[45] Date of Patent: Jan. 16, 1996

[54] TOOTHED BELT FOR POWER TRANSMISSION AND MANUFACTURING METHOD

[75] Inventors: Toru Fujiwara, Tokorozawa; Yoshinori Itoh, Hanno; Masato Tomobuchi, Sakado, all of Japan

[73] Assignee: Tsubakimoto Chain Co., Osaka, Japan

[21] Appl. No.: 382,419

[22] Filed: Feb. 2, 1995

[30] Foreign Application Priority Data

Feb. 4, 1994 [JP] Japan .................... 6-032002

[51] Int. Cl.[6] .................................................. F16G 1/28
[52] U.S. Cl. ............................................ 474/205; 474/271
[58] Field of Search ............................ 474/205, 268, 474/271; 156/137

[56] References Cited

U.S. PATENT DOCUMENTS 4,518,376  5/1985  Mashimo et al. ................. 474/261
5,234,387  8/1993  Fujiwara et al. ................. 474/205
5,417,619  5/1995  Tajima et al. ..................... 474/260

FOREIGN PATENT DOCUMENTS

1-269743  10/1989  Japan .

Primary Examiner—Roger J. Schoeppel
Attorney, Agent, or Firm—Armstrong, Westerman, Hattori, McLeland & Naughton

[57] ABSTRACT

An improved wear resistant toothed belt for enhancing the service life of such belt against chipping of the teeth of such belt such toothed belt having stretching members disposed at the center portion thereof, a tooth portion and a back portion, the tooth surface of the tooth portion being covered with a tooth cloth impregnated with an RFL solution and further impregnated with a rubber paste, the rubber paste containing carbon in an amount of 10 phr or less relative to polymer, the amount of solid content of the RFL solution stuck on the tooth cloth being in the range of 3 to 20 wt % relative to the weight of the tooth cloth, and the amount of the solid content of the rubber paste stuck on the tooth cloth is in the range of from 6 to 18 wt % relative to the weight of the tooth cloth.

2 Claims, 6 Drawing Sheets

TOOTHED BELT FOR POWER TRANSMISSION AND MANUFACTURING METHOD

FIELD OF THE INVENTION

The present invention relates to a toothed belt for power transmission and, particularly, to a toothed belt for driving a cam shaft of a car engine, and a method for manufacturing such belt.

BACKGROUND OF THE INVENTION

A conventional toothed belt includes core wires, that is, stretching members formed at the center portion thereof, a tooth portion and a back portion. The tooth portion is formed of a tooth rubber, and the back portion is formed of a back rubber. Assuming that the side on which teeth are formed is taken as a tooth surface side, the tooth surface side is covered with a tooth cloth made of polyamide, such as nylon.

The tooth cloth made of polyamide, or the like, is impregnated with a rubber paste containing a filler, such as, carbon; or is impregnated with a mixed solution formed by mixing reactant between resorcinol and formaldehyde each with latex, that is vinyl-pyridine-styrene-butadiene-latex, chloroprene-latex or nitril-butadiene-latex, hereinafter referred to as "RFL solution".

One application of such a toothed belt is to drive a cam shaft of a car engine. In recent years, as the output of an engine has been increased, the operational environment of a toothed belt has become high in temperature and the transmission load has increased. On the other hand, there is a tendency that cars become necessaries for domestic use and become high-grade. The toothed belt has been prolonged in service life greater than the service life of the conventional toothed belt. To cope with the above-requirements, the toothed belt has been improved in the material of a tooth rubber and a back rubber, and in the material of a stretching member.

To improve the service life of a toothed belt, it becomes important to study the causes of the failure of the toothed belt. The main causes of the failure of the toothed belt lie in breakage of the belt and in chipping of teeth of the belt. The present invention is intended to overcome chipping of teeth of the belt, which is one of the main causes of failure of the belt.

As the general means for improving the chipping of teeth, there are both a means of improving the wear resistance of a tooth cloth and a means of improving the heat resistance of a tooth cloth. The means for improving the wear resistance of a tooth cloth includes means for increasing the amount of fibers per unit area of a tooth cloth, and a means of improving the wear resistance of fibers used for a tooth cloth. On the other hand, as the means of improving the heat resistance of a tooth cloth, there is a means in which, for a hydrogenated nitrile rubber, referred to as "HSN", a processing agent of an HSN rubber paste is used.

In the present invention, there has been studied how the wear, as a cause of chipping of teeth, proceeds in a toothed belt. To confirm the relationship between the presence, or absence, of a processing agent and wear resistance, a toothed belt, in which surfaces of teeth were covered with a polyamide made tooth cloth not processed by a processing agent, has been first evaluated, with a result that the surfaces of the teeth become nappy for a period of time from several to several tens minutes and the tooth cloth become cottony, thus leading to the chipping of the teeth. Therefore, it is considered that the tooth cloth, processed by a processing agent, is effective not only to be adhesively bonded on a tooth rubber, but also to be protected and to be bound in a suitable density by the processing agent. This enhances the wear resistance against chipping of teeth, resulting in improved durability.

However, it has become apparent that such a processing agent also accelerates wear. When a toothed belt is contacted with a pulley, a tooth cloth is slightly worn and, due to the wear of the tooth cloth, powder of the processing agent becomes present on the surface of the tooth cloth. The powder of the processing agent acts as abrasive when the toothed belt is contacted with the pulley. Specifically, a filler mixed in the processing agent for improving the wear resistance exhibits the reversed function, that is, acts to proceed the wear of the tooth cloth. In particular, the filler made of hard powder acts to abruptly process the wear.

An object of the present invention is to improve the wear resistance of a toothed belt and to enhance the service life against chipping of teeth by processing a tooth cloth constituting the toothed belt using a processing agent having a specified composition.

The above object is accomplished, according to the present invention, by providing a toothed belt in which surfaces of teeth of a tooth rubber are covered with a tooth cloth, characterized in that an impregnated layer by an RFL solution is formed on the tooth cloth and an impregnated layer by a rubber paste containing carbon in an amount of 10 phr, or less, relative to the polymer is formed on the RFL solution impregnated layer.

In addition, preferably, an amount of the solid content of the RFL solution stuck on the tooth cloth is in the range of from 3 to 20 wt % relative to the tooth cloth, and an amount of the solid content of the rubber paste stuck on the tooth cloth is in the range of from 6 to 18 wt % relative to the tooth cloth.

A tooth cloth is first impregnated with an RFL solution. The amount of the solid content of the RFL solution is in the range of 3 to 20 wt % relative to the tooth cloth. The tooth cloth is then impregnated with a rubber paste containing carbon in an amount of 10 phr relative to the polymer. The amount of the solid content of the rubber paste is in the range of from 6 to 18 wt % relative to the tooth cloth. The tooth cloth is thus sequentially formed with the impregnated layer by the RFL solution and the impregnated layer by the rubber paste. The surfaces of the teeth of tooth rubber are then covered with the tooth cloth.

When the toothed belt is contacted with a pulley, the tooth cloth is subjected to wear. The wear is mainly generated in the rubber paste impregnated layer. Because the carbon content in the rubber paste is 10 phr or less, even when the wear powder of carbon is present on the surfaces of teeth upon the contact between the toothed belt and the pulley, the wear powder has little effect as an abrasive, thus reducing the wear of the tooth cloth.

BRIEF DESCRIPTION OF THE DRAWINGS

The present invention will be more fully described and better understood form the following description of a preferred embodiment of the invention taken with the attached drawings in which.

DESCRIPTION OF PREFERRED EMBODIMENTS

Figure 1:
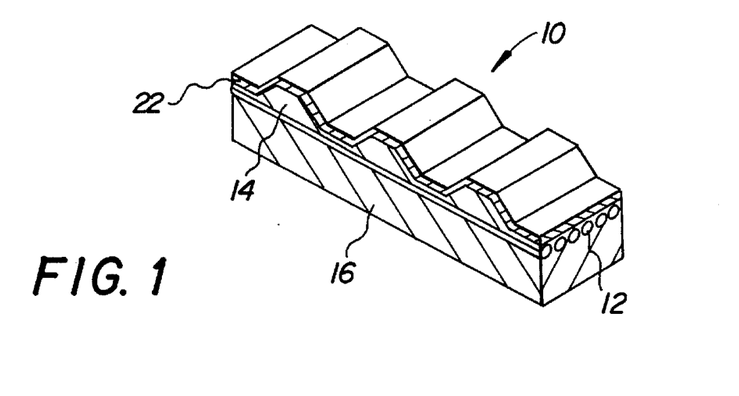
FIG. 1 is a perspective view of a preferred embodiment of a toothed belt of the present invention.

As shown in FIG. 1, a toothed belt 10 of the present invention includes stretching members 12, such as wires, disposed at the center portion thereof, a tooth portion 14 and a back portion 16, with the tooth surface side covered with a tooth cloth 22. The tooth cloth 22 is impregnated with an RFL solution or a rubber paste and is then impregnated with a rubber paste; and the drying of the RFL solution and the rubber paste. The tooth cloth 22 is thus impregnated with an RFL impregnated layer and a rubber paste impregnated layer.

Additionally, before being covered with the tooth cloth 22, the tooth portion 14 may be coated with a rubber paste of the same kind as that of the tooth rubber of the tooth portion 14, for example, a rubber paste containing carbon in an amount of 30 phr or more. The rubber past may further include an isocyanate, or epoxy based adhesive.

An RFL solution is formed by mixing an RF solution with an L solution at a specified ratio. Table 1 shows the prescription formulations of the examples of the RFL solution.

TABLE 1

| | | Prescription example | | |
|---|---|---|---|---|
| Prescription example | | A | B | C |
| RF solution | | | | |
| Resorcinol | (g) | 6.25 | ← | ← |
| Formalin (35%) | (g) | 9.21 | ← | ← |
| HaOH (10%) | (g) | 1.70 | ← | ← |
| Purified water | (g) | 134.01 | ← | ← |
| Subtotal | (g) | 151.17 | ← | ← |
| L solution | | | | |
| Latex | (g) | 221.09 | ← | 218.36 |
| Kind | | 9:1 mixture of Carboxylated HSN latex and Carboxylated NBR latex | Carboxylated NBR latex | VP-SBR latex |
| Solid content | (g) | 40.00 | ← | 40.50 |
| Ammonia (28%) | (g) | 6.21 | ← | 6.21 |
| Purified water | (g) | 601.53 | ← | 604.26 |
| Subtotal | (g) | 828.83 | ← | ← |
| Carbon dispersion solution (10%) | | 20.00 | ← | ← |
| RFL soltuion | | | | |
| Total weight | (g) | 1000.00 | ← | ← |
| Solid content | (%) | 10.00 | ← | ← |
| R/F mol ratio | | 1/1.89 | ← | ← |
| RF/L weight ratio | | 1/9.34 | ← | ← |
| RF solution aging condition | | | | |
| Temperature | 25° C. | | | |
| Time | 6 h | | | |
| RF solution aging condition | | | | |
| Temperature | 25° C. | | | |
| Time | 18 h | | | |
| Sticking amount to tooth cloth: 10% | | | | |
| Processing condition | | | | |
| Drying | | | | |
| Temperature | 150° C. | | | |
| Time | 4 min | | | |
| Baking | | | | |
| Temperature | 220° C. | | | |
| Time | 30 sec | | | |

The RF solution is formed by mixing resorcinol with formaldehyde at a specified ratio, and by adding sodium hydroxide and purified water. The L solution is formed by mixing carboxylated nitril-butadiene-rubber latex with carboxylated and hydrogenated nitril-butadiene-rubber latex at a specified ratio and by adding ammonia and purified water; by adding ammonia and purified water to carboxylated nitril-butadiene-rubber latex; or by mixing ammonia and purified water to vinyl-pyridine-styrene-butadiene-rubber latex.

Table 2 shows the blending examples of rubber pastes.

TABLE 2

| Blending agent | Blending example a | |
|---|---|---|
| Polymer Zetpol 2020 Note 1) | 100 | |
| Filler Carbon black N330 (HAF) | + | ←Variable |
| Curing agent, etc. | | |
| Sulfur | 1 | |

TABLE 2-continued

| Blending agent | Blending example a |
|---|---|
| Curing accelerator | 2 |
| Others | |
| Age resistor | 5 |
| Plasticizer | 4 |
| Wax | 0.5 |
| Zinc white | 5 |
| Stearic acid | 1 |

Note 1) Hydrogenated NBR (hydrogenation ratio: 90%) by Nippon Zeon Co., Ltd.

A rubber paste contains a polymer (for example, Zetpol 2020) and carbon as a filler in a specified amount relative to the polymer. The carbon content, which is important in the present invention, is specified to be 10 phr or less relative to the polymer. In addition, the unit "phr" is short for "part hundred rubber", and which means the amount of carbon relative to 100 parts of the polymer. Accordingly, 10 phr of carbon means 10 parts of the carbon relative to 100 parts of polymer.

Table 3 shows Inventive Examples 1 to 8, Comparative Examples 11 to 16, and Conventional Examples 21 to 24.

Figure 2:
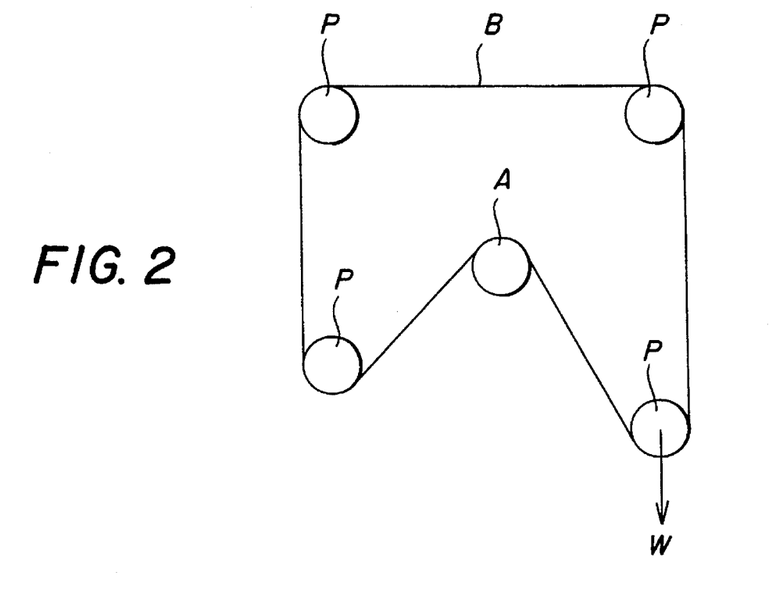
FIG. 2 is a schematic view of a tester for measuring the wear on the toothed belt of the invention.

Next, experiments were performed to evaluate the toothed belt of the present invention. FIG. 2 shows the outline of a tester for measuring the wear amount on surfaces of teeth of a tooth cloth and includes a flat pulley A, spaced flat pulleys P, with a weight W applied to one of the pulleys P and an endless belt B extending around pulley A and pulleys P as shown in FIG. 2, with a constant weight W applied to one of the pulleys P to apply tension to the belt B being tested. Each tested belt had 124 teeth at a pitch of 8 mm and were tested for a constant time at 4000 r/min. at a temperature of 140° C.

Figure 3:
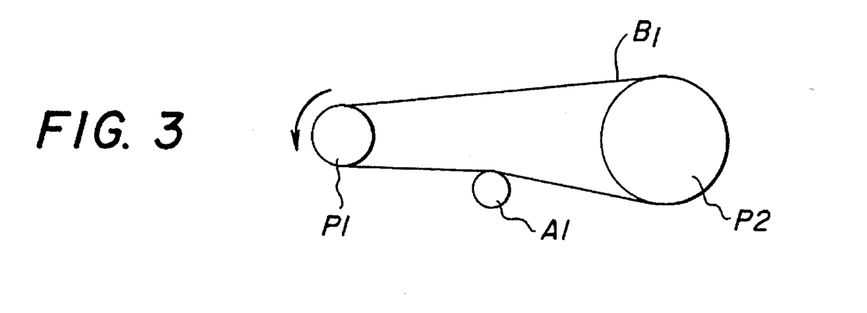
FIG. 3 is a schematic view of a tester for measuring the wear on the toothed belt of the invention.

FIG. 3 shows a tester for measuring the service life against chipping of teeth in the state where a tension is applied to a toothed belt. In FIG. 3, $P_1$ is a toothed pulley having, for example, twenty-two teeth; $P_2$ is a toothed pulley having, for example, forty-four teeth; and $A_1$ is an idle pulley of sixty Θ mm. Each belt B, tested had 124 teeth at a pitch of 8 mm and was tested at an initial tension of 12 kgf, at room temperature at 3000 r/min, measured at $P_1$, the smaller of pulleys $P_1$ and $P_2$, at loaded tension of F kg and 0.61 kg.

The lower portions of the vertical columns in Table 3 shows the test results for adhesive strength, strength retention ratio, wear amount, and service life against chipping of

TABLE 3

| Example | Inventive example | | | | | | | | Comparative example | | | | | | Conventional example | | | |
|---|---|---|---|---|---|---|---|---|---|---|---|---|---|---|---|---|---|---|
| Item | 1 | 2 | 3 | 4 | 5 | 6 | 7 | 8 | 11 | 12 | 13 | 14 | 15 | 16 | 21 | 22 | 23 | 24 |
| Kind of RFL | A | A | A | A | A | A | B | C | — | A | A | A | A | A | A | B | C | — |
| Sticking amount (wt %) | 10 | 10 | 3 | 20 | 10 | 10 | 10 | 10 | — | 10 | 10 | 30 | 10 | 10 | 10 | 10 | 10 | — |
| Kind of rubber paste | a | a | a | a | a | a | a | a | a | a | a | a | a | a | — | — | — | a |
| Carbon content (phr) | 0 | 10 | 0 | 0 | 10 | 10 | 0 | 0 | 0 | 50 | 30 | 0 | 10 | 10 | — | — | — | 50 |
| Sticking amount (wt %) | 10 | 10 | 10 | 10 | 6 | 18 | 10 | 10 | 11 | 10 | 10 | 10 | 2 | 22 | — | — | — | 11 |
| Adhesive | — | — | — | — | — | — | — | — | presence | — | — | — | — | — | — | — | — | presence |
| Adhesive strength (kgf/2 cm) | 23.4 | 24.1 | 22.7 | 25.5 | 25.3 | 24.8 | 23.8 | 16.7 | 7.7 | 24.0 | 23.8 | 22.6 | 23.1 | 11.2 | 25.0 | 24.0 | 9.6 | 12.0 |
| Strength of tooth cloth (warp direction) (kgf/3cm) | | | | | | | | | | | | | | | | | | |
| Initial value | 218 | 215 | 233 | 209 | 221 | 211 | 218 | 229 | 248 | 195 | 204 | 181 | 219 | 206 | 221 | 221 | 236 | 230 |
| After aging | 138 | 135 | 144 | 126 | 137 | 124 | 88 | 58 | 71 | 96 | 102 | 106 | 131 | 69 | 122 | 58 | 39 | 53 |
| Strength retention ratio (%) | 63.3 | 62.8 | 61.8 | 60.3 | 62.0 | 58.8 | 40.4 | 25.3 | 28.6 | 49.2 | 50.0 | 58.6 | 59.8 | 33.5 | 55.2 | 26.2 | 16.5 | 23.0 |
| Belt test | | | | | | | | | | | | | | | | | | |
| Condition A (mm) | 0.04 | 0.04 | 0.05 | 0.04 | 0.04 | 0.05 | 0.06 | 0.11 | x | 0.09 | 0.09 | 0.05 | 0.10 | 0.09 | 0.06 | 0.09 | 0.18 | 0.15 |
| Condition B-1 (h) | 183 | 179 | 171 | 188 | 181 | 169 | 136 | 81 | 7 | 138 | 151 | 116 | 156 | 88 | 143 | 104 | 33 | 74 |
| Condition B-2 (h) | 686 | 681 | 667 | 670 | 669 | 677 | 408 | 193 | 19 | 499 | 518 | 41 | 412 | 541 | 532 | 381 | 112 | 291 |

Kind of rubber paste: a; hydrogenated nitrile rubber
Kind of RFL: corresponding to Table 1
Belt test: corresponding to Tables 2 and 3
x: not measured because of heavy wear teeth. The following facts can be revealed by the experiments.

As shown in Table 3 Comparative Example 11 and Conventional Example 24, a tooth belt in which a tooth cloth is only impregnated with a rubber paste is poor in the adhesive strength, strength retention ratio, wear amount and chipping of teeth, and therefore, such tooth belts are less desirable for practical use.

In comparison in Table 3 of Inventive Examples 1 and 2 with Conventional Example 21, a toothed cloth in which a tooth cloth is only impregnated with an RFL solution, the toothed belt is increased in wear and is short in service life against chipping of teeth. On the contrary, a tooth cloth in which a tooth cloth is impregnated with a rubber paste and is protected by the runner paste, has improved wear resistance and service life is enhanced against chipping of belt teeth.

Figure 4:
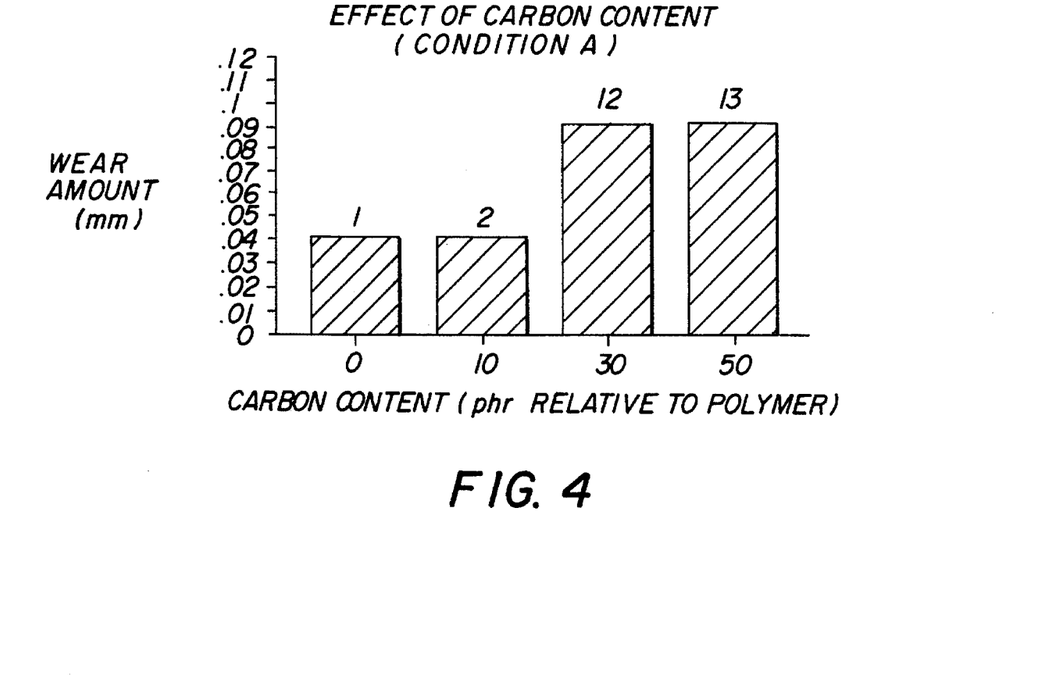
FIG. 4 is a graph showing the wear amount with respect to a toothed belt having a tooth cloth impregnated with each of rubber pastes containing different carbon contents as measured by the tester shown in FIG. 2.
Figure 5:
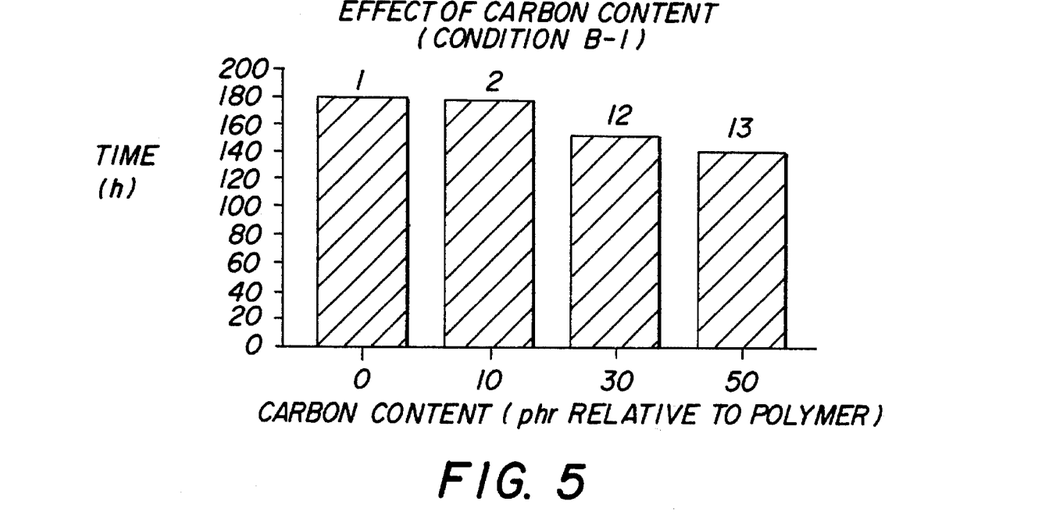
FIG. 5 is a graph showing a service life against chipping of teeth with respect to a toothed belt having a tooth cloth impregnated with each of rubber pastes containing different carbon contents as measured by the tester shown in FIG. 3.
Figure 6:
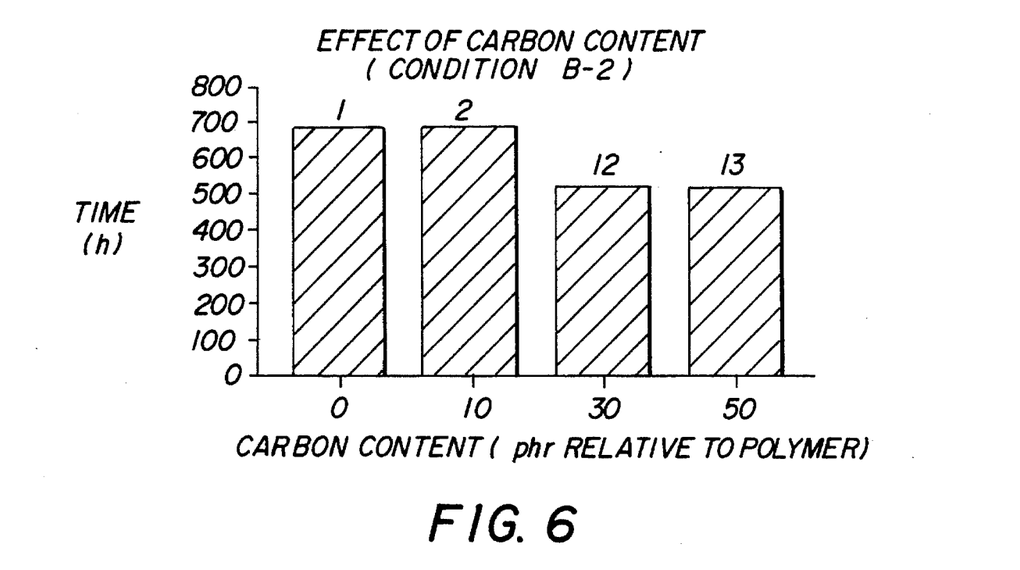
FIG. 6 is a graph showing a service life against chipping of teeth with respect to a toothed belt having a tooth cloth impregnated with each of rubber pastes containing different carbon contents as measured by the tester shown in FIG. 3.

However, in comparison of Inventive Examples 1 and 2 with Comparative Examples 12 and 13, as shown in FIGS. 4 to 6, even when a tooth cloth is impregnated with an RFL solution and further impregnated with a rubber paste, the wear is increased and the service life against chipping of teeth is shortened in the case where the carbon content of the rubber paste is large. As a result, when the tooth cloth is impregnated with an RFL solution and a rubber paste, in the case where the carbon content of the rubber paste is 30 phr or more, the wear is increased and the service life against chipping of teeth is reduced.

Consequently, reduction in the carbon content to be 10 phr, or less, relative to polymer reduces the wear amount and enhancing the service life against chipping of teeth.

Figure 7:
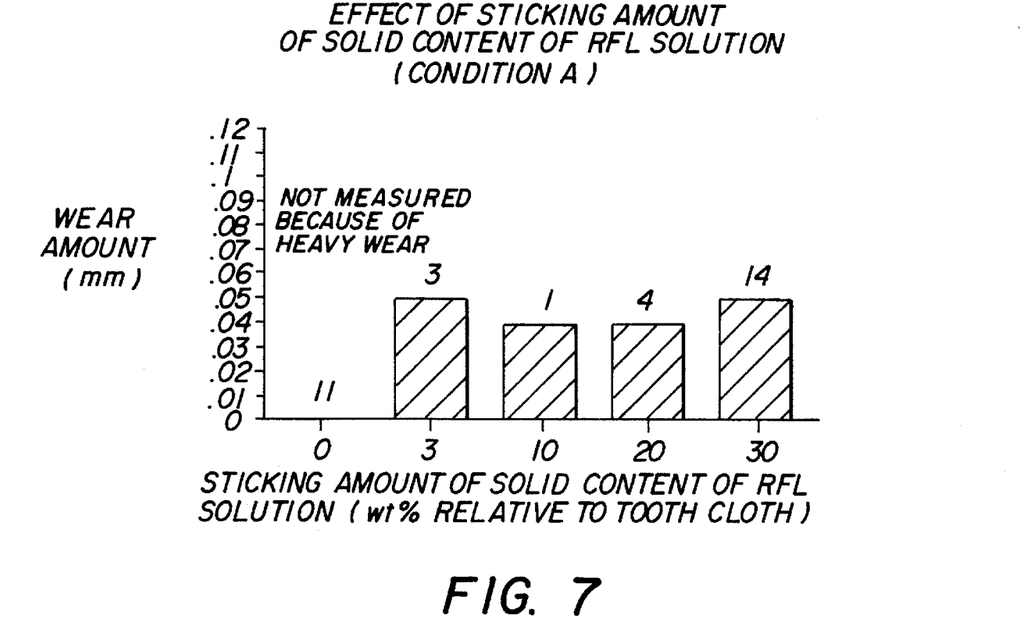
FIG. 7 is a graph showing a wear amount with respect to a toothed belt having each tooth cloth different in the sticking amount of the solid content of an RFL solution as measured by the tester shown in FIG. 2.
Figure 8:
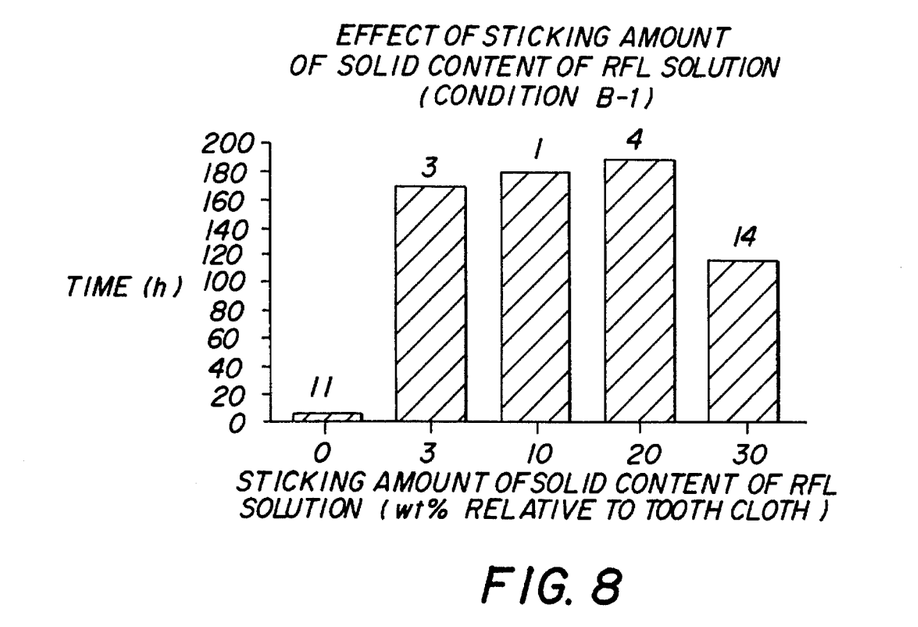
FIG. 8 is a graph showing a service life against chipping of teeth with respect to each toothed belt different in the sticking amount of the solid content of an RFL solution as measured by the tester in shown FIG. 2.
Figure 9:
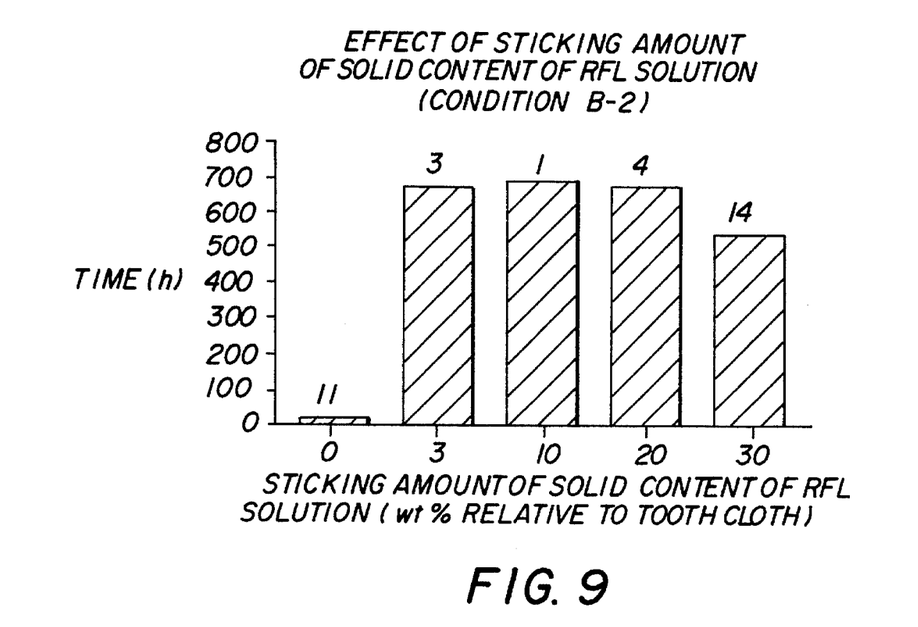
FIG. 9 is a graph showing a service life against chipping of teeth with respect to a toothed belt having each tooth cloth different in the sticking amount of the solid content of an RFL solution as measured by the tester shown in FIG. 3.

In comparison of Inventive Examples 1, 3 and 4 with Comparative Examples 11 and 14, as shown in FIGS. 7 to 9, a tooth cloth in which an RFL solution is not stuck, cannot be practically used. However, as shown in Inventive Example 3, only the sticking amount to the tooth cloth, in an amount of about 3 wt %, is sufficiently effective to reduce the wear and to enhance the service life against chipping of teeth. On the other hand, as shown in Comparative Example 14, when the sticking amount to the tooth cloth reaches 30 wt %, the effect is lowered. Accordingly, the sticking amount of the solid content of the RFL solution may be in the range of from 3 to 20 wt % relative to the tooth cloth, preferably, about 10 wt % as shown in Inventive Examples 1 and 4.

Figure 10:
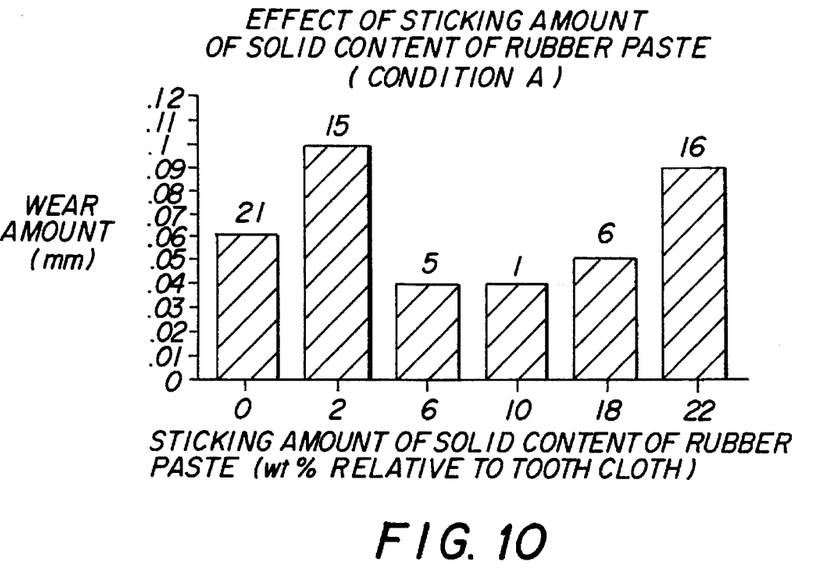
FIG. 10 is a graph showing the wear amount with respect to a toothed belt having each tooth cloth different in the sticking amount of the solid content of a rubber paste as measured by the tester shown in FIG. 2.
Figure 11:
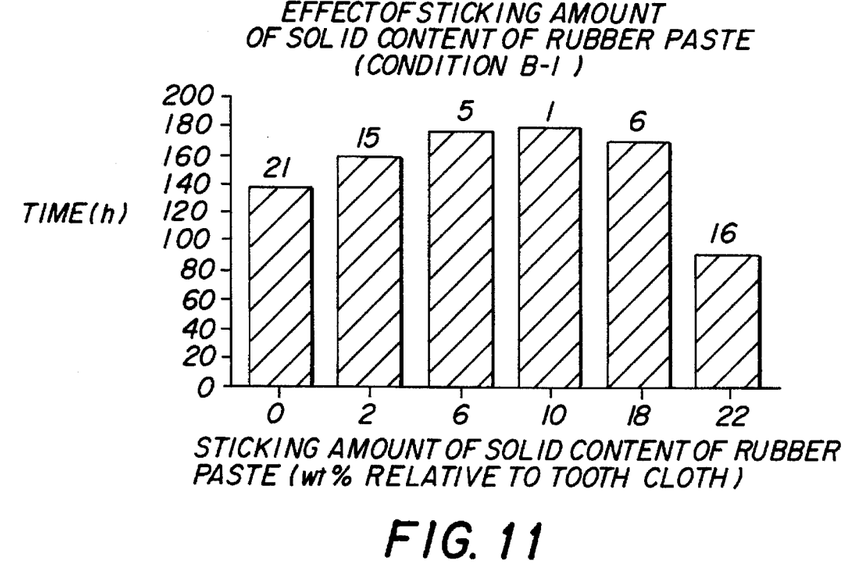
FIG. 11 is a graph showing the service life against chipping of teeth with respect to each toothed belt different in the sticking amount of the solid content of a rubber paste as measured by the tester shown in FIG. 3.
Figure 12:
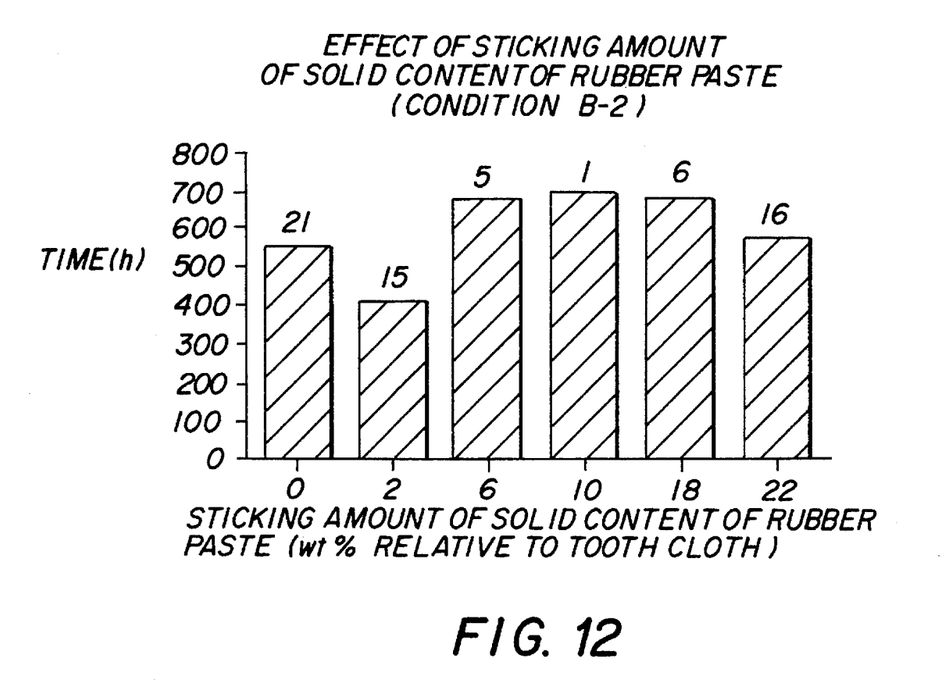
FIG. 12 is a graph showing a service life against chipping of teeth with respect to each toothed belt different in the sticking amount of the solid content of a rubber paste as measured by the tester shown in FIG. 3.

In comparison of Inventive Examples 1, 5 and 6 with Comparative Examples 15 and 16, and Conventional Example 21, as shown in FIGS. 10 to 12, the case with no sticking amount to rubber (Conventional Example 21) is as described above. As shown in Inventive Example 5, the sticking amount of at least 6 wt % is sufficiently effective to keep the wear resistance and the service life against chipping of teeth. However, when the sticking amount reaches 2 wt %, as shown in Comparative Example 15, the wear is increased and the service life against chipping of teeth is reduced. Moreover, as shown in Inventive Example 6, the sticking amount of 18 wt % can keep the wear amount and service life against chipping of teeth in allowable ranges. However, as shown in Comparative Example 16, the sticking amount of 22 wt % reduces the wear amount and the service life against chipping of teeth. Accordingly, the sticking amount of the solid content of a rubber paste may be in the range of from 6 to 18 wt % relative to the tooth cloth. The sticking amount is preferably in the range of from 8 to 11 wt %, more preferably, about 10 wt %.

Finally, in comparison of Inventive Examples 7 and 8 with Conventional Examples 22 and 23, irrespective of the kind of RFL solutions, the processing of the tooth cloth, already impregnated with an RFL solution, with a rubber paste containing no carbon contributes to the improvement in the wear resistance and enhancement in the service life against chipping of teeth of the toothed belt.

In the present invention, an impregnated layer of an RFL solution is formed on a tooth cloth for covering surfaces of teeth of a tooth rubber, and on the RFL solution impregnated layer, an impregnated layer of a rubber paste containing carbon in an amount of 10 phr, or less, relative to the polymer is formed. Accordingly, wear powder of the relatively hard solid content of the RFL solution, generated by the contact between the tooth belt and a pulley, tends not to be present on the surfaces of teeth of the toothed belt and reduce the wear. This improves the wear resistance of the tooth cloth and, hence, enhances the service life of the toothed belt.

Because the carbon content of a rubber paste is suppressed to 10 phr, or less, relative to the polymer, the powder of the solid content of the rubber paste generated by the wear does not act as abrasive and, hence, little accelerates the wear of the tooth cloth. This reduces the wear amount of the tooth cloth and improves the service life against chipping of teeth. Thus, it is particularly desirable to eliminate the carbon content.

What is claimed is:

1. A toothed belt in which surfaces of teeth of a tooth rubber are covered with a tooth cloth, characterized in that an impregnated layer of an RFL solution is formed on said tooth cloth and an impregnated layer of a rubber paste containing carbon in an amount of 10 phr, or less, relative to polymer is formed on said RFL solution impregnated layer; and an amount of a solid content of said RFL solution stuck on said tooth cloth is in the range of from 3 to 20 wt % relative to the weight of said tooth cloth, and an amount of a solid content of said rubber paste stuck on said tooth cloth is in the range of from 6 to 18 wt % relative to the weight of said tooth cloth.

2. A method of manufacturing a toothed belt in which surfaces of teeth of a tooth rubber are covered with a tooth cloth, characterized in that said tooth cloth is impregnated with an RFL solution in such a manner that a solid content of said RFL solution stuck on said tooth cloth is in an amount of 3 to 20 wt % relative to the weight of said tooth cloth, and said tooth cloth is further impregnated with a rubber paste containing carbon in an amount of 10 phr, or less, relative to polymer so that the solid content of said rubber paste is stuck on said tooth cloth in an amount of 6 to 18 wt % to the weight of said tooth cloth; and the surfaces of said teeth of said tooth rubber are covered with said tooth cloth.

* * * * *